United States Patent
Hu et al.

(10) Patent No.: US 11,308,351 B2
(45) Date of Patent: Apr. 19, 2022

(54) METHOD AND APPARATUS FOR RECOGNIZING SEQUENCE IN IMAGE, ELECTRONIC DEVICE, AND STORAGE MEDIUM

(71) Applicant: SENSETIME INTERNATIONAL PTE. LTD., Singapore (SG)

(72) Inventors: Wenyang Hu, Singapore (SG); Xiaocong Cai, Singapore (SG); Jun Hou, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 15 days.

(21) Appl. No.: 16/848,680

(22) Filed: Apr. 14, 2020

(65) Prior Publication Data

US 2021/0073578 A1 Mar. 11, 2021

Related U.S. Application Data

(63) Continuation of application No. PCT/IB2019/058117, filed on Sep. 25, 2019.

(30) Foreign Application Priority Data

Sep. 5, 2019 (CN) .......................... 201910838281.0

(51) Int. Cl.
*G06K 9/62* (2006.01)
*G06T 7/11* (2017.01)

(52) U.S. Cl.
CPC ......... *G06K 9/6232* (2013.01); *G06K 9/6279* (2013.01); *G06T 7/11* (2017.01)

(58) Field of Classification Search
CPC .... G06K 9/6232; G06K 9/6279; G06K 9/468; G06K 9/4628; G06T 7/11
See application file for complete search history.

(56) References Cited

U.S. PATENT DOCUMENTS

| | | |
|---|---|---|
| 2005/0282622 A1 | 12/2005 | Lindquist |
| 2006/0160600 A1* | 7/2006 | Hill ......................... G07F 17/32 463/17 |

(Continued)

FOREIGN PATENT DOCUMENTS

| | | |
|---|---|---|
| CN | 102722708 A | 10/2012 |
| CN | 104298976 A | 1/2015 |

(Continued)

*Primary Examiner* — Siamak Harandi
(74) *Attorney, Agent, or Firm* — BakerHostetler

(57) ABSTRACT

The present disclosure relates to a method and apparatus for recognizing a sequence in an image, an electronic device, and a storage medium. The method includes: performing feature extraction on a to-be-processed image to obtain a first feature map of the to-be-processed image, where the to-be-processed image includes a sequence formed by stacking at least one object along a stacking direction; determining a region feature of each segmented region in the to-be-processed image based on the first feature map, where all segmented regions are obtained by dividing the to-be-processed image into k regions along the stacking direction, k is a set number of objects stacked along the stacking direction, and k is an integer greater than 1; and determining a category of each object in the sequence based on the region feature of each segmented region. Embodiments of the present disclosure may implement recognition of stacked objects in a sequence.

18 Claims, 4 Drawing Sheets

(56) References Cited

U.S. PATENT DOCUMENTS

| | | | |
|---|---|---|---|
| 2006/0160608 A1* | 7/2006 | Hill | G07F 17/3293 |
| | | | 463/25 |
| 2017/0161987 A1* | 6/2017 | Bulzacki | G06K 9/00201 |
| 2018/0075698 A1* | 3/2018 | Shigeta | G07F 17/3248 |
| 2018/0144579 A1* | 5/2018 | Shigeta | G06K 19/07758 |
| 2018/0211110 A1* | 7/2018 | Shigeta | G07F 1/06 |
| 2018/0211472 A1* | 7/2018 | Shigeta | G07F 17/3272 |
| 2018/0239984 A1* | 8/2018 | Shigeta | G06K 9/4652 |
| 2018/0247134 A1* | 8/2018 | Bulzacki | A63F 3/00157 |
| 2019/0102987 A1* | 4/2019 | Shigeta | A44C 21/00 |
| 2019/0147689 A1* | 5/2019 | Shigeta | G07F 17/3293 |
| | | | 463/25 |
| 2020/0302168 A1* | 9/2020 | Vo | G06K 9/6267 |
| 2020/0402342 A1* | 12/2020 | Kelly | G06N 3/006 |

FOREIGN PATENT DOCUMENTS

| | | |
|---|---|---|
| CN | 109344832 A | 2/2019 |
| JP | 2017-136347 A | 8/2017 |
| JP | 2019-088775 A | 6/2019 |
| JP | 2020-536324 A | 12/2020 |
| WO | WO 2019/068141 A1 | 4/2019 |

\* cited by examiner

METHOD AND APPARATUS FOR RECOGNIZING SEQUENCE IN IMAGE, ELECTRONIC DEVICE, AND STORAGE MEDIUM

CROSS-REFERENCE TO RELATED APPLICATIONS

The present application is a bypass continuation of and claims priority under 35 U.S.C. § 111(a) to PCT Application No. PCT/IB2019/058117, filed on Sep. 25, 2019, which claims priority to Chinese Patent Application No. 201910838281.0, filed with the Chinese Patent Office on Sep. 5, 2019, and entitled "METHOD AND APPARATUS FOR RECOGNIZING SEQUENCE IN IMAGE, ELECTRONIC DEVICE, AND STORAGE MEDIUM", which is incorporated herein by reference in its entirety.

TECHNICAL FIELD

The present disclosure relates to the technical field of computers, and in particular, to a method and apparatus for recognizing a sequence in an image, an electronic device, and a storage medium.

BACKGROUND

Recognition of a sequence in an image is an important research issue in computer vision. A sequence recognition algorithm is widely applied to scenarios such as scene text recognition and license plate recognition.

SUMMARY

The present disclosure provides a technical solution for recognizing a sequence in an image.

A method for recognizing a sequence in an image provided according to one aspect of the present disclosure includes: performing feature extraction on a to-be-processed image to obtain a first feature map of the to-be-processed image, where the to-be-processed image includes a sequence formed by stacking at least one object along a stacking direction; determining a region feature of each segmented region in the to-be-processed image based on the first feature map, where all segmented regions are obtained by dividing the to-be-processed image into k regions along the stacking direction, k is a set number of objects stacked along the stacking direction, and k is an integer greater than 1; and determining a category of each object in the sequence based on the region feature of each segmented region.

In a possible implementation, the determining a category of each object in the sequence based on the region feature of each segmented region includes: determining, based on the region feature of a first segmented region, a probability that the first segmented region belongs to each set object category, where the first segmented region is any one of all the segmented regions; and determining an object category with a maximum probability among object categories to which the region feature of the first segmented region belongs as an object category to which the region feature of the first segmented region belongs.

In a possible implementation, the step of determining, based on the region feature of a first segmented region, a probability that the first segmented region belongs to each set object category is implemented by a classification network, the classification network includes a first convolution layer and a softmax layer, the number of convolution kernels in the first convolution layer is equal to the number of set object categories, a size of the convolution kernels is 1×N, N is a length of the region feature of each segmented region, and N is an integer greater than 1; and the determining, based on the region feature of a first segmented region, a probability that the first segmented region belongs to each set object category includes:

performing convolution processing on the region feature of the first segmented region by using each convolution kernel in the first convolution layer respectively, to determine a category feature belonging to each set object category among features of the first segmented region; and processing the category feature by using the softmax layer in the classification network, to determine a probability that the features of the first segmented region belong to each set object category.

In a possible implementation, the step of performing feature extraction on a to-be-processed image to obtain a first feature map of the to-be-processed image is implemented by a feature extraction network; the feature extraction network includes a second convolution layer and a pooling layer; and the performing feature extraction on a to-be-processed image to obtain a first feature map of the to-be-processed image includes:

performing feature extraction on the to-be-processed image by using the second convolution layer, to obtain a second feature map; and performing pooling processing on the second feature map by using the pooling layer, to obtain the first feature map, where a feature dimension of the first feature map is less than a feature dimension of the second feature map.

In a possible implementation, the to-be-processed image includes an image of a surface of an object constituting the sequence along the stacking direction.

In a possible implementation, the at least one object in the sequence is a sheet-like object with a certain thickness.

In a possible implementation, the stacking direction is a thickness direction of the object in the sequence.

In a possible implementation, a surface of the at least one object in the sequence along the stacking direction has a set identifier, and the identifier includes at least one of a color, a texture, or a pattern.

In a possible implementation, the to-be-processed image is obtained by cropping the sequence from a collected image, and one end of the sequence is aligned with one edge of the to-be-processed image.

In a possible implementation, objects in the sequence have a same thickness, and a length of the to-be-processed image along the stacking direction is k times the thickness of the objects in the sequence.

In a possible implementation, the objects in the sequence have different thicknesses, and the length of the to-be-processed image along the stacking direction is k times a maximum thickness of an object of a possible category in the sequence.

In a possible implementation, the method further includes: after the category of each object in the sequence is determined, determining a total value represented by the sequence based on a correspondence between the category and a value represented by the category.

An apparatus for recognizing a sequence in an image provided according to one aspect of the present disclosure includes: a feature extraction module, configured to perform feature extraction on a to-be-processed image to obtain a first feature map of the to-be-processed image, where the to-be-processed image includes a sequence formed by stacking at least one object along a stacking direction; a region feature determination module, configured to determine a region feature of each segmented region in the to-be-processed image based on the first feature map, where all segmented regions are obtained by dividing the to-be-processed image into k regions along the stacking direction, k is a set number of objects stacked along the stacking direction, and k is an integer greater than 1; and a category determination module, configured to determine a category of each object in the sequence based on the region feature of each segmented region.

In a possible implementation, the category determination module includes: a probability determination submodule, configured to determine, based on the region feature of a first segmented region, a probability that the first segmented region belongs to each set object category, where the first segmented region is any one of all the segmented regions; and a category determination submodule, configured to determine an object category with a maximum probability among object categories to which the region feature of the first segmented region belongs as an object category to which the region feature of the first segmented region belongs.

In a possible implementation, the probability determination submodule is implemented by a classification network, the classification network includes a first convolution layer and a softmax layer, the number of convolution kernels in the first convolution layer is equal to the number of set object categories, a size of the convolution kernels is 1×N, N is a length of the region feature of each segmented region, and N is an integer greater than 1; and the probability determination submodule is configured to:

perform convolution processing on the region feature of the first segmented region by using each convolution kernel in the first convolution layer respectively, to determine a category feature belonging to each set object category among features of the first segmented region; and process the category feature by using the softmax layer in the classification network, to determine a probability that the features of the first segmented region belong to each set object category.

In a possible implementation, the feature extraction module is implemented by a feature extraction network; the feature extraction network includes a second convolution layer and a pooling layer; and the feature extraction module is configured to:

perform feature extraction on the to-be-processed image by using the second convolution layer, to obtain a second feature map; and perform pooling processing on the second feature map by using the pooling layer, to obtain the first feature map, where a feature dimension of the first feature map is less than a feature dimension of the second feature map.

In a possible implementation, the to-be-processed image includes an image of a surface of an object constituting the sequence along the stacking direction.

In a possible implementation, the at least one object in the sequence is a sheet-like object with a certain thickness.

In a possible implementation, the stacking direction is a thickness direction of the object in the sequence.

In a possible implementation, a surface of the at least one object in the sequence along the stacking direction has a set identifier, and the identifier includes at least one of a color, a texture, or a pattern.

In a possible implementation, the to-be-processed image is obtained by cropping the sequence from a collected image, and one end of the sequence is aligned with one edge of the to-be-processed image.

In a possible implementation, objects in the sequence have a same thickness, and a length of the to-be-processed image along the stacking direction is k times the thickness of the objects in the sequence.

In a possible implementation, the objects in the sequence have different thicknesses, and the length of the to-be-processed image along the stacking direction is k times a maximum thickness of an object of a possible category in the sequence.

In a possible implementation, the apparatus further includes: a value determination module, configured to: after the category of each object in the sequence is determined, determine a total value represented by the sequence based on a correspondence between the category and a value represented by the category.

An electronic device provided according to one aspect of the present disclosure includes: a processor, and a memory configured to store processor executable instructions, where the processor is configured to invoke the instructions stored in the memory, to perform the foregoing method.

A computer readable storage medium provided according to one aspect of the present disclosure has computer program instructions stored thereon, and the foregoing method is implemented when the computer program instructions are executed by a processor.

A computer program provided according to one aspect of the present disclosure includes a computer readable code, where when the computer readable code runs in an electronic device, a processor in the electronic device performs the foregoing method.

According to the embodiments of the present disclosure, a feature map of an image in an object sequence can be extracted, a to-be-processed image is divided into multiple segmented regions, a region feature of each segmented region is determined, and a category of each object in the sequence is determined based on the region feature respectively, thereby implementing recognition of tacked objects in the sequence, reducing recognition difficulty through segment recognition, and improving the recognition effect.

It should be understood that the foregoing general descriptions and the following detailed descriptions are merely exemplary and explanatory, but are not intended to limit the present disclosure. Exemplary embodiments are described in detail below with reference to the accompanying drawings, and other features and aspects of the present disclosure become clear.

BRIEF DESCRIPTION OF THE DRAWINGS

The accompanying drawings here are incorporated into the specification and constitute a part of the specification. These accompanying drawings show embodiments that conform to the present disclosure, and are intended to describe the technical solutions in the present disclosure together with the specification.

DETAILED DESCRIPTION

Figure 1:
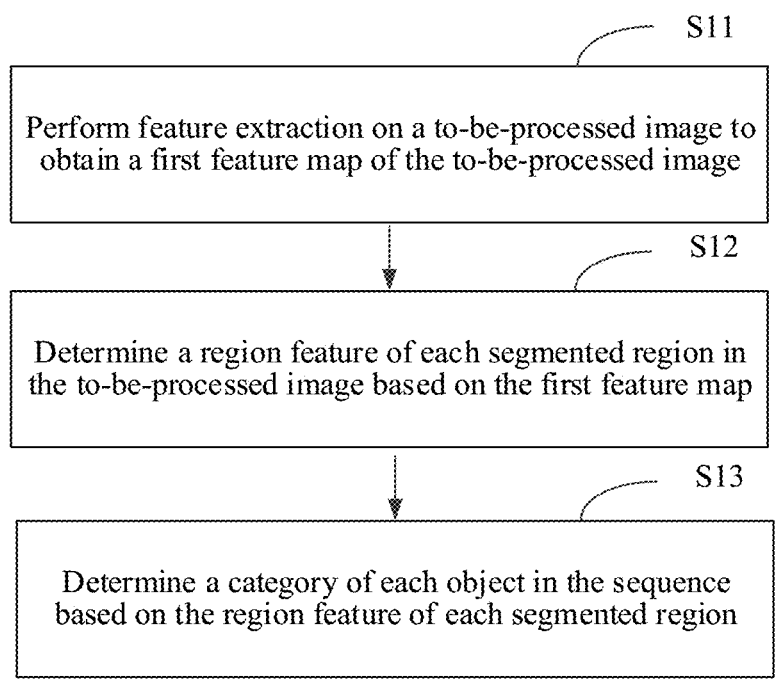
FIG. 1 is a flowchart of a method for recognizing a sequence in an image according to embodiments of the present disclosure.

The following describes various exemplary embodiments, features, and aspects of the present disclosure in detail with reference to the accompanying drawings. Same reference numerals in the accompanying drawings represent elements with same or similar functions. Although various aspects of the embodiments are illustrated in the accompanying drawings, the accompanying drawings are not necessarily drawn in proportion unless otherwise specified.

The special term "exemplary" here refers to "used as an example, an embodiment, or an illustration". Any embodiment described as "exemplary" here should not be explained as being superior to or better than other embodiments.

The term "and/or" herein describes only an association relationship describing associated objects and represents that three relationships may exist. For example, A and/or B may represent the following three cases: only A exists, both A and B exist, and only B exists. In addition, the term "at least one" herein indicates any one of multiple listed items or any combination of at least two of multiple listed items. For example, including at least one of A, B, or C may indicate including any one or more elements selected from a set consisting of A, B, and C.

In addition, for better illustration of the present disclosure, various specific details are given in the following specific implementations. A person skilled in the art should understand that the present disclosure may also be implemented without the specific details. In some instances, methods, means, elements, and circuits well known to a person skilled in the art are not described in detail so as to highlight the subject matter of the present disclosure.

FIG. 1 is a flowchart of a method for recognizing a sequence in an image according to embodiments of the present disclosure. As shown in FIG. 1, the method includes the following steps.

At step S11, feature extraction is performed on a to-be-processed image to obtain a first feature map of the to-be-processed image, where the to-be-processed image includes a sequence formed by stacking at least one object along a stacking direction.

At step S12, a region feature of each segmented region in the to-be-processed image is determined based on the first feature map, where all segmented regions are obtained by dividing the to-be-processed image into k regions along the stacking direction, k is a set number of objects stacked along the stacking direction, and k is an integer greater than 1.

At step S13, a category of each object in the sequence is determined based on the region feature of each segmented region.

In a possible implementation, the method for recognizing a sequence in an image may be performed by an electronic device such as a terminal device or a server. The terminal device may be User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor by invoking computer readable instructions stored in a memory. Alternatively, the method may be performed by a server.

In a possible implementation, the to-be-processed image may be an image collected by an image collection device or an image obtained in other manners, and the to-be-processed image includes the sequence formed by stacking the at least one object along the stacking direction. The at least one object in the sequence is a sheet-like object with a certain thickness, such as, a chip, a coin, a book, or a tire. A type of a stacked object in the to-be-processed image, a specific manner of obtaining the to-be-processed image, and a specific type of an object in the sequence in the to-be-processed image are not limited in the present disclosure.

In a possible implementation, the to-be-processed image is obtained by cropping the sequence from a collected image, and one end of the sequence is aligned with one edge of the to-be-processed image. For example, the image collected by the image collection device is a region image of an image collection region of an application scenario, and an image of an object sequence cropped from the region image is used as the to-be-processed image. A specific manner of capturing the to-be-processed image is not limited in the present disclosure.

In a possible implementation, a stacking direction of an object in the sequence in the to-be-processed image is a thickness direction of the object in the sequence. Thicknesses of all objects in the sequence may be the same or may be different, which is not limited in the preset disclosure.

In a possible implementation, the to-be-processed image may include an image of a surface of an object constituting the sequence along the stacking direction. If the stacking direction is the thickness direction, the to-be-processed image includes an image constituting the sequence along the thickness direction.

Figure 2A:
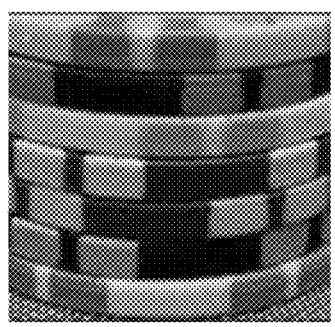
FIG. 2a and FIG. 2b are schematic diagrams of a to-be-processed image in a method for recognizing a sequence in an image according to embodiments of the present disclosure.
Figure 2B:
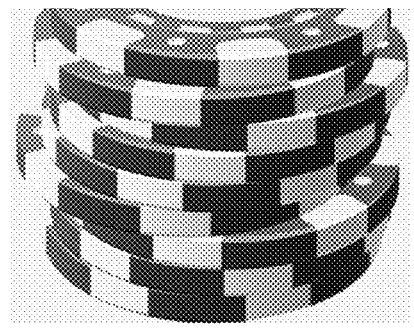

FIG. 2a and FIG. 2b are schematic diagrams of a to-be-processed image in a method for recognizing a sequence in an image according to embodiments of the present disclosure. FIG. 2a shows a sequence with regular stacking, and FIG. 2b shows a sequence with irregular stacking. As shown in FIG. 2a and FIG. 2b, the to-be-processed image is an image along the thickness direction, namely, an image of a side face of an object constituting the sequence. Objects in the sequence are regularly or irregularly stacked along the thickness direction of the objects. Because the segmented regions are obtained through division along the stacking direction, the sequence with regular stacking or the sequence with irregular stacking such as a ragged sequence does not affect the division manner of the segmented regions, and therefore does not affect sequence recognition either.

In a possible implementation, a surface of the at least one object in the sequence along the stacking direction has a set identifier, and the identifier includes at least one of a color, a texture, or a pattern.

As shown in FIG. 2a and FIG. 2b, the stacking direction is the thickness direction of each object in the sequence, and a side face of each object has a set identifier, so that each object category can be determined based on the identifier. For example, when the object in the sequence is a chip or a coin, the category of the object may indicate a value or a virtual value represented by the object.

In a possible implementation, the identifier may include at least one of a color, a texture, or a pattern. For example, yellow is used to represent an object of a category A, and green is used to represent an object of a category B; or a narrower texture is used to represent an object of a category A, and a wider texture is used to represent an object of a category B; Objects of different categories may also be represented by a combination of at least two of the color, the texture, and the pattern.

A person skilled in the art may specify the identifier of the object of each category based on actual situations. Both the number of categories of the objects and the set style of the identifier of the object of each category are not limited in the present disclosure.

In some application scenarios (such as a game scenario), the objects in the sequence in the to-be-processed image need to be recognized and classified. For example, the actual number of the objects and the category of each object (such as the value or virtual value represented by the object) are recognized.

In a possible implementation, the number k of objects stacked along the stacking direction may be preset, and k is an integer greater than 1, for example, k=40. The number of objects in the sequence in the to-be-processed image is less than or equal to the number k. If the number of objects in the sequence in the to-be-processed image is greater than k, the to-be-processed image may be divided into multiple images for processing. It should be understood that a person skilled in the art may set the number k based on actual situations, which is not limited in the present disclosure.

In a possible implementation, objects in the sequence have a same thickness, and a length of the to-be-processed image along the stacking direction is k times the thickness of the objects in the sequence. In other words, if the objects of all categories in the sequence have the same thickness, the length of the to-be-processed image along the stacking direction may be K times or greater than K times the thickness of the objects. In this way, the classification of the objects in the sequence may be facilitated.

In a possible implementation, the objects in the sequence have different thicknesses, and the length of the to-be-processed image along the stacking direction is k times a maximum thickness of the object of a possible category in the sequence. In other words, if the objects of all categories in the sequence have different thicknesses, the length of the to-be-processed image along the stacking direction may be k times or greater than k times the maximum thickness of the object of the possible category in the sequence. In this way, the classification of objects in the sequence may be facilitated.

In a possible implementation, at step S11, feature extraction may be performed on the to-be-processed image by using a feature extraction network to obtain the first feature map of the to-be-processed image. The feature extraction network is, for example, a convolutional neural network, including a convolution layer, a pooling layer, and the like. The specific type of the feature extraction network is not limited in the present disclosure.

In a possible implementation, at step S12, the to-be-processed image may be divided into k segmented regions along the stacking direction based on the first feature map, and the region feature of each segmented region is determined. The shape of each region feature is related to the thickness of each object in the sequence in the to-be-processed image.

In a possible implementation, at step S13, the region features of all the segmented regions may be classified by using a classification network, and a probability that an object corresponding to each segmented region belongs to each set category is determined, so as to determine the category of each object. The classification network is, for example, a convolutional neural network, including a convolution layer, a softmax layer, and the like. The specific type of the classification network is not limited in the present disclosure.

According to the embodiments of the present disclosure, a feature map of an image in an object sequence can be extracted, a to-be-processed image is divided into multiple segmented regions, a region feature of each segmented region is determined, and a category of each object in the sequence is determined based on each region feature, thereby implementing recognition of stacked objects in the sequence and improving the recognition effect.

In a possible implementation, step S11 may be implemented by a feature extraction network. The feature extraction network includes a second convolution layer and a pooling layer, and step S11 includes:

performing feature extraction on the to-be-processed image by using the second convolution layer, to obtain a second feature map; and performing pooling processing on the second feature map by using the pooling layer, to obtain the first feature map, where a feature dimension of the first feature map is less than a feature dimension of the second feature map.

For example, the second convolution layer may include one or more convolution layers. The pooling layer is, for example, an average pooling layer or other types of pooling layers. After the to-be-processed image is input into the feature extraction network, convolution may be performed on the to-be-processed image by using the second convolution layer, to obtain the second feature image. Then, pooling processing is performed on the second feature map by using the pooling layer, to obtain the first feature map. The feature dimension of the first feature map is less than the feature dimension of the second feature map. For example, the feature dimension of the second feature map is 8192×1, and the feature dimension of the first feature map is 4096×1. In this way, when the classification network does not need to perform classification processing on too many features subsequently, the processing speed of the classification network may be improved.

None of the number of convolution layers, the type of the pooling layer, and parameter setting in the feature extraction network is limited in the present disclosure.

In a possible implementation, after the first feature map is obtained, the to-be-processed image may be divided into the k segmented regions along the object stacking direction at step S12, and a feature corresponding to each segmented region in the first feature map is determined as the region feature of each segmented region. The first feature map may be reshaped based on each segmented region, so that the first feature map becomes a feature sequence formed by stacking the region feature of each segmented region.

For example, if the feature dimension of the first feature map is 4096×1, and the number k of the segmented regions in the to-be-processed image is 16, the feature dimension of the region feature of each segmented region is 256×1, and the first feature map may be reshaped as a 16×256 feature sequence. That is, the shape of the feature sequence is the number (for example, 16) of the segmented regions×the feature length N (for example, 256) of the region feature of each segmented region. In this way, subsequent classification processing on each segmented region may be facilitated.

In a possible implementation, step S13 may include:

determining, based on the region feature of a first segmented region, a probability that the first segmented region belongs to each set object category, where the first segmented region is any one of all the segmented regions; and determining an object category with a maximum probability among object categories to which the region feature of the first segmented region belongs as an object category to which the region feature of the first segmented region belongs.

For example, if the region features of all the segmented regions in the to-be-processed image are determined, the region features of all the segmented regions may be classified. For example, the objects in the sequence have at most P object categories, and P is an integer greater than 1. For example, in a game scenario, the category of an object in the sequence in the to-be-processed image is a value (or a virtual value) represented by the object. For example, five categories are set to represent objects of five values: 5, 10, 20, 50, and 100. The number of the object categories is not limited in the present disclosure.

In a possible implementation, for any segmented region (for example, referred to as the first segmented region) in all the segmented regions, the object in the first segmented region may be predicted based on the region feature of the first segmented region, and a probability that the object in the first segmented region belongs to each set object category is determined. The object category with the maximum probability among the object categories to which the region feature of the first segmented region belongs may be determined as the object category to which the region feature of the first segmented region belongs. For example, if probabilities that the first segmented region belongs to the five set categories are respectively 0.2, 0.8, 0.1, 0.07, and 0.3, the object category with the probability of 0.8 may be determined as the object category to which the object in the first segmented region belongs.

In this manner, category prediction may be performed on the object in each segmented region respectively, to obtain an object category to which the object in each segmented region belongs, so as to determine the category of each object in the sequence in the to-be-processed image, thereby implementing recognition of the sequence in the image.

In a possible implementation, the step of determining, based on the region feature of a first segmented region, a probability that the first segmented region belongs to each set object category is implemented by a classification network. The classification network includes a first convolution layer and a softmax layer, the number of convolution kernels in the first convolution layer is equal to the number of set object categories, a size of the convolution kernels is 1×N, N is a length of the region feature of each segmented region, and N is an integer greater than 1.

The determining, based on the region feature of a first segmented region, a probability that the first segmented region belongs to each set object category includes:

performing convolution processing on the region feature of the first segmented region by using each convolution kernel in the first convolution layer respectively, to determine a category feature belonging to each set object category among features of the first segmented region; and processing the category feature by using the softmax layer in the classification network, to determine a probability that the features of the first segmented region belong to each set object category.

For example, a classification network is used to classify the region features of all the segmented regions. The classification network may include a first convolution layer and a softmax layer. The number of convolution kernels in the first convolution layer is equal to the number (P) of set object categories, a size of the convolution kernels is 1×N, N is a length of the region feature of each segmented region, and N is an integer greater than 1. For example, when the number P of the set object categories is 5, the first convolution layer includes five convolution kernels corresponding to the object categories; and when the feature length N of each region feature is 256, the size of each convolution kernel is 1×256.

In a possible implementation, convolution processing may be performed on the region feature of the first segmented region by using each convolution kernel in the first convolution layer respectively, to determine the category feature belonging to each set object category among the features of the first segmented region. The category feature is, for example, a feature value, a feature vector, or the like, and the specific form of the category feature is not limited in the present disclosure.

In a possible implementation, the category feature may be processed by using the softmax layer in the classification network to determine the probability that the features of the first segmented region belong to each set object category.

The number of first convolution layers and the number of softmax layers in the classification network may correspond to the number k of the segmented regions in the to-be-processed image. Therefore, the region feature of each segmented region may be input into each first convolution layer in the classification network and is processed by each first convolution layer and each softmax layer to obtain an object category to which each segmented region belongs, thereby determining the category of each object in the sequence in the to-be-processed image and implementing recognition of the sequence in the image.

Figure 3:
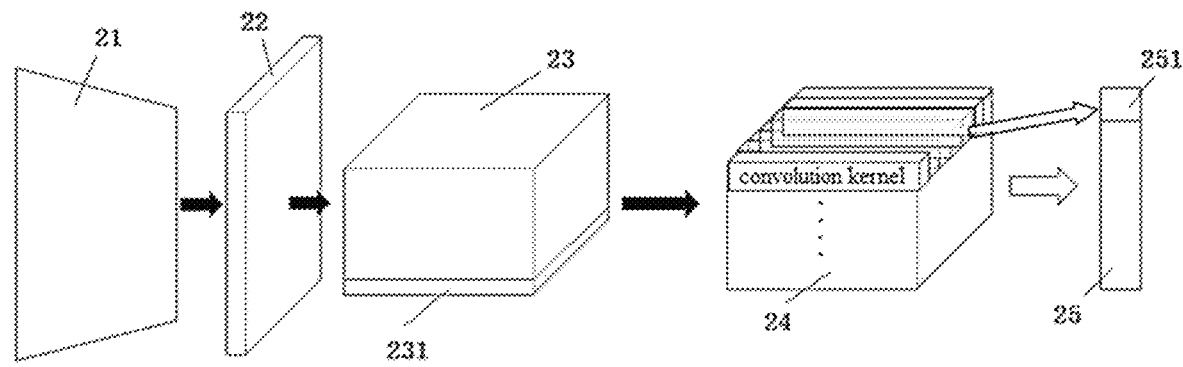
FIG. 3 is a schematic diagram of a processing process of a method for recognizing a sequence in an image according to embodiments of the present disclosure.

FIG. 3 is a schematic diagram of a processing process of a method for recognizing a sequence in an image according to embodiments of the present disclosure. As shown in FIG. 3, a to-be-processed image may be input into a feature extraction network 21 for feature extraction to obtain a first feature map 22 (for example, a 4096×1 feature map) of the to-be-processed image. The to-be-processed image may be divided into k segmented regions along an object stacking direction based on the first feature map 22, and a feature corresponding to each segmented region in the first feature map is determined as a region feature of each segmented region.

In this example, the first feature map 22 may be reshaped, so that the first feature map becomes a feature sequence 23 formed by stacking the region feature of each segmented region. A height of the feature sequence 23 corresponds to the number of the segmented regions in the to-be-processed image (for k objects in the sequence, for example, k=16), a length of the feature sequence 23 corresponds to a feature length of the region feature of each segmented region (for example, the feature length N=256), and a width of the feature sequence 23 corresponds to a feature width of the region feature of each segmented region. For example, the feature sequence 23 includes a region feature 231 of the lowermost segmented region, where the height is 1 and the length is N=256.

In this example, after the feature sequence 23 is obtained, the feature sequence 23 may be input into a first convolution layer of a classification network 24 for processing. The number of convolution kernels in the first convolution layer of the classification network 24 is equal to the number of set object categories (for example, P=5), and the number of the first convolution layers may be equal to the number of the segmented regions in the to-be-processed image (for example, k=16). The region feature of each segmented region in the feature sequence 23 may be input into each convolution kernel of a corresponding first convolution layer respectively, to obtain P category features of the region feature of each segmented region. Then, the P category features of each segmented region are separately input into a softmax layer for processing respectively, to obtain a probability that each segmented region belongs to each set object category.

In this example, an object category with a maximum probability among object categories to which each segmented region belongs may be determined as an object category to which the region feature of the segmented region belongs, to obtain a recognition result 25 of the sequence in the image. The recognition result 25 includes the category of each object in the sequence in the to-be-processed image, for example, 251 represents the object category of the uppermost object in the sequence.

In a possible implementation, the method for recognizing a sequence in an image according to the embodiments of the present disclosure may further include: after the category of each object in the sequence is determined, determining a total value represented by the sequence based on a correspondence between the category and a value represented by the category.

For example, in some scenarios (for example, a game scenario), the category of an object in the sequence in the to-be-processed image is a value represented by the object. For example, five categories are set to represent objects of five values (or virtual values), i.e., 5, 10, 20, 50, and 100. After the category of each object in the sequence is determined, the total value represented by the sequence may be determined based on the correspondence between the category of each object in the sequence and the value represented by the category. For example, the sequence includes eight objects, and values represented by the categories of all the objects are 20, 20, 50, 5, 10, 5, 100, and 50 respectively. In this case, it may be determined, through calculation, that the total value represented by the sequence is 260.

In this manner, automatic recognition of the total value represented by the sequence may be implemented.

In a possible implementation, the feature extraction network and the classification network may be trained before the feature extraction network and the classification network are applied. The method for recognizing a sequence in an image further includes:

training the feature extraction network and the classification network based on a preset training set, where the training set includes multiple sample images.

For example, the feature extraction network and the classification network are trained together based on the preset training set. The training set includes multiple sample images. Each sample image has annotation information, such as the number, thickness, and category of the object in an annotation sequence.

In a possible implementation, the training set may further include an augmented image of a sample image. The method further includes: performing image augmentation processing on the sample image to obtain an augmented image of the sample image, where the image augmentation processing includes at least one of an image net policy, random image edge clipping, random longitudinal image clipping, or random occlusion. The image net policy may include at least one of the following processing on the sample image: distortion, discoloration, brightness adjustment, clarity adjustment, or the like.

That is, the number of the sample images may be increased through the image augmentation processing to improve the training effect. The augmented image may use annotation information of a corresponding sample image. Image augmentation may be performed through the image net policy, the random image edge clipping, the random longitudinal image clipping, the random occlusion, or the like. The specific manner of the image augmentation is not limited in the present disclosure.

In this manner, the trained feature extraction network and the trained classification network may implement recognition of stacked objects in a real scenario in the case of blurring, occlusion, or irregular placement, thereby significantly improving recognition accuracy.

In a possible implementation, the step of training the feature extraction network and the classification network based on a preset training set may include:

inputting a sample image into the feature extraction network for feature extraction to obtain a feature map of the sample image; determining a region feature of each segmented region in the to-be-processed image based on the feature map of the sample image; determining a category of each object in a sequence in the sample image based on the region feature of each segmented region; determining network loss of the feature extraction network and the classification network based on the category of each object in the sequence in the sample image and annotation information of the sample image; and training the feature extraction network and the classification network based on the network loss.

For example, the sample image may be input into the feature extraction network to output the feature map of the sample image. The to-be-processed image is divided into k segmented regions along an object stacking direction, and a feature corresponding to each segmented region in the first feature map is determined as the region feature of each segmented region. The first feature map may be reshaped based on each segmented region, so that the feature map becomes a feature sequence formed by stacking the region feature of each segmented region.

In a possible implementation, the feature sequence may be input into the classification network to output a probability that each segmented region belongs to each set object category, and an object category with a maximum probability among object categories to which the region feature of each segmented region belongs is determined as an object category to which the region feature of the segmented region belongs, that is, a recognition result of the sequence in the sample image.

In a possible implementation, the network loss of the feature extraction network and the classification network may be determined based on the recognition result of the sequence in the sample image and the annotation information of the sample image.

In a possible implementation, the network loss includes at least one of a cross-entropy loss function, a center loss function, or a mean square error. The cross-entropy loss function and the center loss function may be used to indicate a difference between the recognition result of the sequence in the sample image and an annotation result in the annotation information, to monitor the recognition result of the sequence in the sample image. The mean square error may be used to indicate a difference between a predicted thickness of each object (that is, a height of each segmented region) in the sequence in the sample image and a real thickness of each object, to monitor division of segmented regions in the sample image. Therefore, a trained neural network may divide the segmented regions based on extracted features, thereby accurately classifying different objects in the sequence into different segmented regions.

In a possible implementation, the feature extraction network and the classification network may be trained based on the network loss. That is, values of all loss functions are reversely propagated together to calculate a parameter gradient, and parameters of the feature extraction network and the classification network are updated. After multiple adjustments, when a preset training condition is met (for example, the network loss is converged or a preset number of adjustments is reached), the feature extraction network and the classification network subjected to the final adjustment may be used as trained feature extraction network and classification network. The specific training condition and training manner are not limited in the present disclosure.

In this manner, a network training process may be completed to obtain the feature extraction network and the classification network that may be actually applied.

In the method for recognizing a sequence in an image according to the embodiments of the present disclosure, accurate recognition of each object in the sequence in the image can be implemented, and recognition of stacked objects in a real scenario in the case of blurring, occlusion, or irregular placement can be implemented. In addition, both a model size and a model speed of a fully convolutional neural network model used are excellent, thereby fascinating deployment in an actual scenario.

The method for recognizing a sequence in an image according to the embodiments of the present disclosure is versatile and can be adapted to various scenarios of recognition of stacked objects in a sequence. For example, in a game scenario, an image of a game chip sequence or a game coin sequence cropped from a collected image may be recognized by using the method, to implement functions such as intelligent win-loss payment and intelligent chip amount verification, so that the game scenario is more standardized, secure, and trusted.

It may be understood that the foregoing method embodiments mentioned in the present disclosure may be combined with each other to obtain a combined embodiment without departing from the principle and the logic. Details are not described in the present disclosure due to space limitation. A person skilled in the art may understand that, in the foregoing method in specific implementations, a specific execution sequence of the steps should be determined based on functions and possible internal logics of the steps.

In addition, the present disclosure further provides an apparatus for recognizing a sequence in an image, an electronic device, a computer readable storage medium, and a program. The foregoing are all used to implement any method for recognizing a sequence in an image provided in the present disclosure. For corresponding technical solutions and descriptions, refer to corresponding descriptions of the method. Details are not described again.

Figure 4:
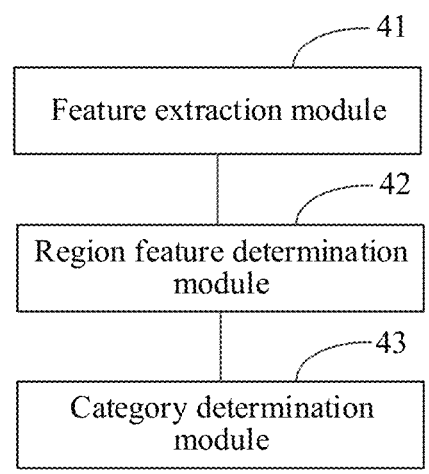
FIG. 4 is a block diagram of an apparatus for recognizing a sequence in an image according to embodiments of the present disclosure.

FIG. 4 is a block diagram of an apparatus for recognizing a sequence in an image according to embodiments of the present disclosure. As shown in FIG. 4, the apparatus includes:

a feature extraction module 41, configured to perform feature extraction on a to-be-processed image to obtain a first feature map of the to-be-processed image, where the to-be-processed image includes a sequence formed by stacking at least one object along a stacking direction;

a region feature determination module 42, configured to determine a region feature of each segmented region in the to-be-processed image based on the first feature map, where all segmented regions are obtained by dividing the to-be-processed image into k regions along the stacking direction, k is a set number of objects stacked along the stacking direction, and k is an integer greater than 1; and a category determination module 43, configured to determine a category of each object in the sequence based on the region feature of each segmented region.

In a possible implementation, the category determination module includes: a probability determination submodule, configured to determine, based on the region feature of a first segmented region, a probability that the first segmented region belongs to each set object category, where the first segmented region is any one of all the segmented regions; and a category determination submodule, configured to determine an object category with a maximum probability among object categories to which the region feature of the first segmented region belongs as an object category to which the region feature of the first segmented region belongs.

In a possible implementation, the probability determination submodule is implemented by a classification network, the classification network includes a first convolution layer and a softmax layer, the number of convolution kernels in the first convolution layer is equal to the number of set object categories, a size of the convolution kernels is 1×N, N is a length of the region feature of each segmented region, and N is an integer greater than 1; and the probability determination submodule is configured to:

perform convolution processing on the region feature of the first segmented region by using each convolution kernel in the first convolution layer respectively, to determine a category feature belonging to each set object category among features of the first segmented region; and process the category feature by using the softmax layer in the classification network, to determine a probability that the features of the first segmented region belong to each set object category.

In a possible implementation, the feature extraction module is implemented by a feature extraction network; the feature extraction network includes a second convolution layer and a pooling layer; and the feature extraction module is configured to:

perform feature extraction on the to-be-processed image by using the second convolution layer, to obtain a second feature map; and perform pooling processing on the second feature map by using the pooling layer, to obtain the first feature map, where a feature dimension of the first feature map is less than a feature dimension of the second feature map.

In a possible implementation, the to-be-processed image includes an image of a surface of an object constituting the sequence along the stacking direction.

In a possible implementation, the at least one object in the sequence is a sheet-like object with a certain thickness.

In a possible implementation, the stacking direction is a thickness direction of the object in the sequence.

In a possible implementation, a surface of the at least one object in the sequence along the stacking direction has a set identifier, and the identifier includes at least one of a color, a texture, or a pattern.

In a possible implementation, the to-be-processed image is obtained by cropping the sequence from a collected image, and one end of the sequence is aligned with one edge of the to-be-processed image.

In a possible implementation, objects in the sequence have a same thickness, and a length of the to-be-processed image along the stacking direction is k times the thickness of the objects in the sequence.

In a possible implementation, the objects in the sequence have different thicknesses, and the length of the to-be-processed image along the stacking direction is k times a maximum thickness of an object of a possible category in the sequence.

In a possible implementation, the apparatus further includes: a value determination module, configured to: after the category of each object in the sequence is determined, determine a total value represented by the sequence based on a correspondence between the category and a value represented by the category.

In some embodiments, functions or modules included in the apparatus provided in the embodiments of the present disclosure may be configured to perform the method described in the foregoing method embodiments. For specific implementation of the apparatus, reference may be made to descriptions of the foregoing method embodiments. For brevity, details are not described here again.

The embodiments of the present disclosure further provide a computer readable storage medium having computer program instructions stored thereon, where the foregoing method is implemented when the computer program instructions are executed by a processor. The computer readable storage medium may be a non-volatile computer readable storage medium or a volatile computer readable storage medium.

The embodiments of the present disclosure further provide an electronic device, including a processor, and a memory configured to store processor executable instructions, where the processor is configured to invoke the instructions stored in the memory, to perform the foregoing method.

The embodiments of the present disclosure further provide a computer program. The computer program includes a computer readable code, and when the computer readable code runs in an electronic device, a processor in the electronic device performs the foregoing method.

The electronic device may be provided as a terminal, a server, or devices in other forms.

Figure 5:
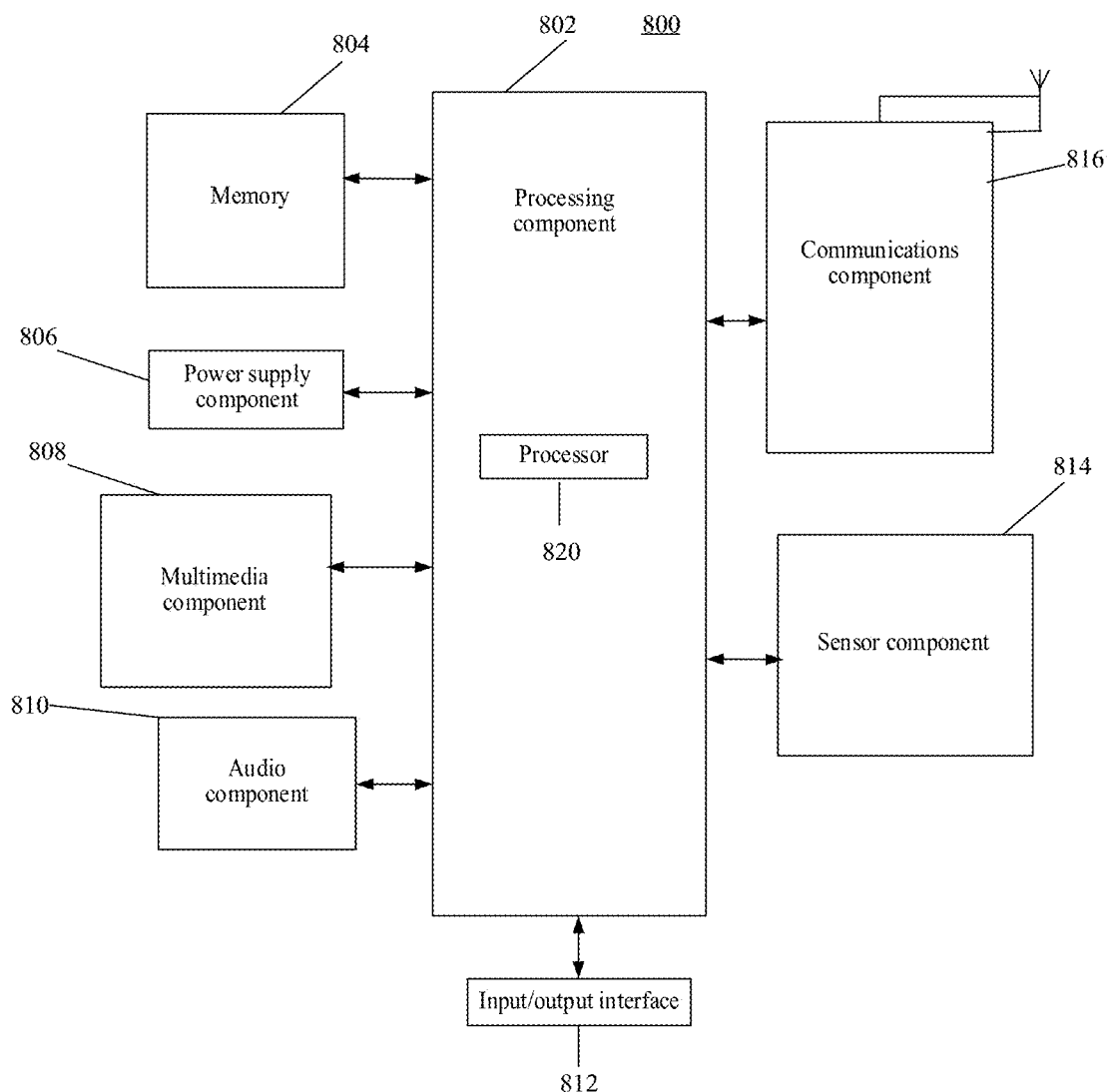
FIG. 5 is a block diagram of an electronic device according to embodiments of the present disclosure.

FIG. 5 is a block diagram of an electronic device 800 according to embodiments of the present disclosure. For example, the electronic device 800 may be a terminal such as a mobile phone, a computer, a digital broadcast terminal, a message transceiver device, a game console, a tablet device, a medical device, a fitness device, or a personal digital assistant.

Referring to FIG. 5, the electronic device 800 may include one or more of the following components: a processing component 802, a memory 804, a power supply component 806, a multimedia component 808, an audio component 810, an Input/Output (I/O) interface 812, a sensor component 814, and a communications component 816.

The processing component 802 usually controls the overall operation of the electronic device 800, such as operations associated with display, telephone call, data communication, a camera operation, or a recording operation. The processing component 802 may include one or more processors 820 to execute instructions, to complete all or some of the steps of the foregoing method. In addition, the processing component 802 may include one or more modules, for convenience of interaction between the processing component 802 and other components. For example, the processing component 802 may include a multimedia module, for convenience of interaction between the multimedia component 808 and the processing component 802.

The memory 804 is configured to store data of various types to support an operation on the electronic device 800. For example, the data includes instructions, contact data, phone book data, a message, an image, or a video of any application program or method that is operated on the electronic device 800. The memory 804 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power supply component 806 supplies power to various components of the electronic device 800. The power supply component 806 may include a power management system, one or more power supplies, and other components associated with power generation, management, and allocation for the electronic device 800.

The multimedia component 808 includes a screen that provides an output interface and is between the electronic device 800 and a user. In some embodiments, the screen may include a Liquid Crystal Display (LCD) and a Touch Panel (TP). If the screen includes the touch panel, the screen may be implemented as a touchscreen, to receive an input signal from the user. The touch panel includes one or more touch sensors to sense a touch, a slide, and a gesture on the touch panel. The touch sensor may not only sense a boundary of a touch operation or a slide operation, but also detect duration and pressure related to the touch operation or the slide operation. In some embodiments, the multimedia component 808 includes a front-facing camera and/or a rear-facing camera. When the electronic device 800 is in an operation mode, for example, a photographing mode or a video mode, the front-facing camera and/or the rear-facing camera may receive external multimedia data. Each front-facing camera or rear-facing camera may be a fixed optical lens system that has a focal length and an optical zoom capability.

The audio component 810 is configured to output and/or input an audio signal. For example, the audio component 810 includes one microphone (MIC). When the electronic device 800 is in an operation mode, such as a call mode, a recording mode, or a voice recognition mode, the microphone is configured to receive an external audio signal. The received audio signal may be further stored in the memory 804 or sent by using the communications component 816. In some embodiments, the audio component 810 further includes a speaker, configured to output an audio signal.

The I/O interface 812 provides an interface between the processing component 802 and a peripheral interface module, and the peripheral interface module may be a keyboard, a click wheel, a button, or the like. These buttons may include, but are not limited to, a home button, a volume button, a startup button, and a lock button.

The sensor component 814 includes one or more sensors, and is configured to provide status evaluation in various aspects for the electronic device 800. For example, the sensor component 814 may detect an on/off state of the electronic device 800 and relative positioning of components, and the components are, for example, a display and a keypad of the electronic device 800. The sensor component 814 may also detect a location change of the electronic device 800 or a component of the electronic device 800, existence or nonexistence of contact between the user and the electronic device 800, an orientation or acceleration/deceleration of the electronic device 800, and a temperature change of the electronic device 800. The sensor component 814 may include a proximity sensor, configured to detect existence of a nearby object when there is no physical contact. The sensor component 814 may further include an optical sensor, such as a CMOS or CCD image sensor, configured for use in imaging application. In some embodiments, the sensor component 814 may further include an acceleration sensor, a gyro sensor, a magnetic sensor, a pressure sensor, or a temperature sensor.

The communications component 816 is configured for wired or wireless communication between the electronic device 800 and other devices. The electronic device 800 may be connected to a communication-standard-based wireless network, such as Wi-Fi, 2G or 3G, or a combination thereof. In an exemplary embodiment, the communications component 816 receives a broadcast signal or broadcast-related information from an external broadcast management system through a broadcast channel. In an exemplary embodiment, the communications component 816 further includes a Near Field Communication (NFC) module, to facilitate short-range communication. For example, the NFC module is implemented based on a Radio Frequency Identification (RFID) technology, an Infrared Data Association (IrDA) technology, an Ultra Wideband (UWB) technology, a Bluetooth (BT) technology, and other technologies.

In an exemplary embodiment, the electronic device 800 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to perform the foregoing method.

In an exemplary embodiment, a non-volatile computer readable storage medium, for example, the memory 804 including computer program instructions, is further provided. The computer program instructions may be executed by the processor 820 of the electronic device 800 to complete the foregoing method.

Figure 6:
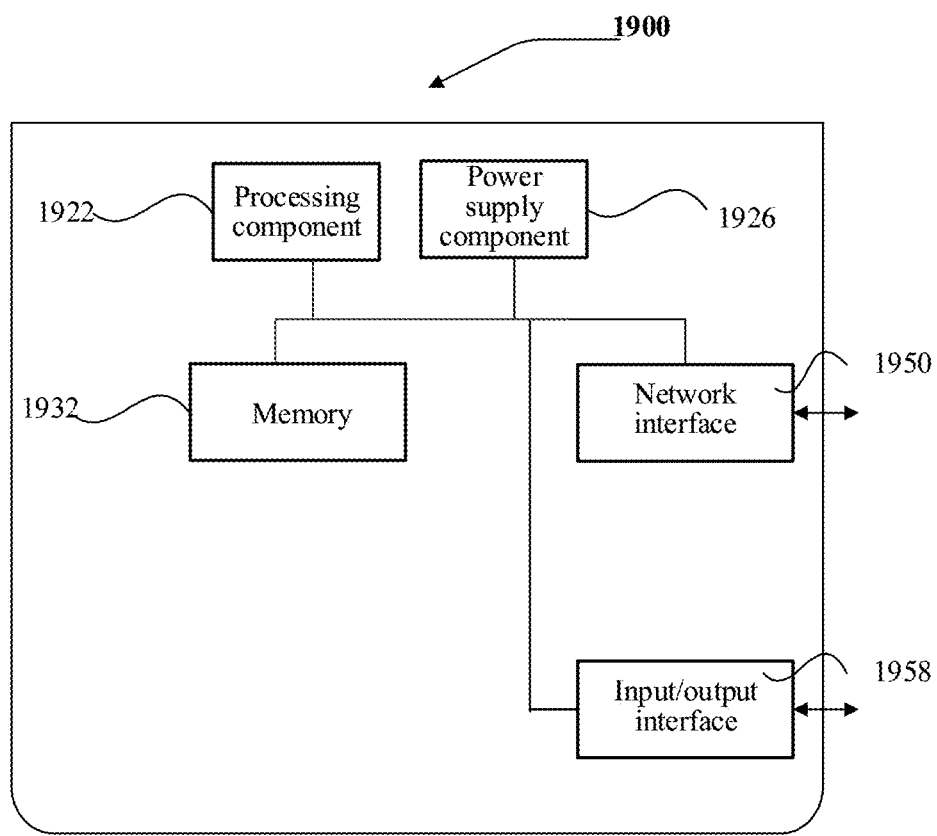
FIG. 6 is a block diagram of an electronic device according to embodiments of the present disclosure.

FIG. 6 is a block diagram of an electronic device 1900 according to embodiments of the present disclosure. For example, the electronic device 1900 may be provided as a server. Referring to FIG. 6, the electronic device 1900 includes a processing component 1922 that further includes one or more processors; and a memory resource represented by a memory 1932, configured to store instructions, for example, an application program, that may be executed by the processing component 1922. The application program stored in the memory 1932 may include one or more modules, each of which correspond to a set of instructions. In addition, the processing component 1922 is configured to execute the instructions to perform the foregoing method.

The electronic device 1900 may further include: a power supply component 1926, configured to perform power management of the electronic device 1900; a wired or wireless network interface 1950, configured to connect the electronic device 1900 to a network; and an Input/Output (I/O) interface 1958. The electronic device 1900 may operate an operating system stored in the memory 1932, such as Windows Server™, Mac OS X™, Unix™, Linux™, or FreeBSD™.

In an exemplary embodiment, a non-volatile computer readable storage medium, for example, the memory 1932 including computer program instructions, is further provided. The computer program instructions may be executed by the processing component 1922 of the electronic device 1900 to complete the foregoing method.

The present disclosure may be a system, a method, and/or a computer program product. The computer program product may include a computer readable storage medium, on which computer readable program instructions that are used by the processor to implement various aspects of the present disclosure are loaded.

The computer readable storage medium may be a tangible device that may maintain and store instructions used by an instruction execution device. The computer readable storage medium for example, may be, but is not limited to, an electrical storage device, a magnetic storage device, an optical storage device, an electromagnetic storage device, a semiconductor storage device, or any appropriate combination thereof. More specific examples (a non-exhaustive list) of the computer readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing instructions or a protrusion structure in a groove, and any appropriate combination thereof. The computer readable storage medium used here is not interpreted as an instantaneous signal such as a radio wave or other freely propagated electromagnetic waves, an electromagnetic wave propagated by a waveguide or other transmission media (for example, an optical pulse transmitted by an optical fiber cable), or an electrical signal transmitted by a wire.

The computer readable program instructions described here may be downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter or a network interface in each computing/processing device receives the computer readable program instructions from the network, and forwards the computer readable program instructions, so that the computer readable program instructions are stored in a computer readable storage medium in each computing/processing device.

Computer program instructions for executing the operations of the present disclosure may be compilation instructions, Instruction Set Architecture (ISA) instructions, machine instructions, machine-related instructions, microcode, firmware instructions, status setting data, or source code or target code written in any combination of one or more programming languages. The programming languages include an object-oriented programming language such as Smalltalk or C++, and a conventional procedural programming language such as the "C" language or a similar programming language. The program readable program instructions may be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any kind of network, including a Local Area Network (LAN) or a Wide Area Network (WAN), or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer readable program instructions, and the electronic circuit may execute the computer readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams may be implemented by using the computer readable program instructions.

These computer readable program instructions may be provided for a general-purpose computer, a dedicated computer, or processors of other programmable data processing apparatuses to generate a machine, so that when the instructions are executed by the computer or the processors of the other programmable data processing apparatuses, an apparatus for implementing a specified function/action in one or more blocks in the flowcharts and/or block diagrams is generated. These computer readable program instructions may be stored in a computer readable storage medium, and these instructions may instruct a computer, a programmable data processing apparatus, and/or other devices to work in a specific manner. Therefore, the computer readable storage medium storing the instructions includes an artifact, and the artifact includes instructions for implementing a specified function/action in one or more blocks in the flowcharts and/or block diagrams.

The computer readable program instructions may be loaded onto a computer, other programmable data processing apparatuses, or other devices, so that a series of operations and steps are executed on the computer, the other programmable apparatuses, or the other devices, thereby generating computer-implemented processes. Therefore, the instructions executed on the computer, the other programmable apparatuses, or the other devices implement the specified functions/actions in the one or more blocks in the flowcharts and/or block diagrams.

The flowcharts and block diagrams in the accompanying drawings show possible architectures, functions, and operations of the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system that executes a specified function or action, or may be implemented by using a combination of dedicated hardware and a computer instruction.

Different embodiments in the present application may be mutually combined without violating logic. The different embodiments emphasize different aspects, and for a part not described in detail, reference may be made to descriptions of other embodiments.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms used in the specification are intended to best explain the principles of the embodiments, practical applications, or technical improvements to the technologies in the market, or to enable others of ordinary skill in the art to understand the embodiments disclosed in the specification.

The present disclosure relates to a method and an apparatus for recognizing a sequence in an image, an electronic device, and a storage medium. The method includes: performing feature extraction on a to-be-processed image to obtain a first feature map of the to-be-processed image, where the to-be-processed image includes a sequence formed by stacking at least one object along a stacking direction; determining a region feature of each segmented region in the to-be-processed image based on the first feature map, where all segmented regions are obtained by dividing the to-be-processed image into k regions along the stacking direction, k is a set number of objects stacked along the stacking direction, and k is an integer greater than 1; and determining a category of each object in the sequence based on the region feature of each segmented region. Embodiments of the present disclosure may implement recognition of stacked objects in a sequence.

The invention claimed is:

1. A method for recognizing a sequence in an image, comprising:

performing feature extraction on a to-be-processed image to obtain a first feature map of the to-be-processed image, wherein the to-be-processed image comprises a sequence formed by stacking a plurality of objects along a stacking direction;

determining a region feature of each segmented region of a plurality of segmented regions in the to-be-processed image based on the first feature map, wherein all segmented regions of the plurality of segmented regions are obtained by dividing the to-be-processed image into k regions along the stacking direction, k is a set number of objects stacked along the stacking direction, and k is an integer greater than 1; and determining a category of each object in the sequence based on the region feature of each segmented region, wherein the determining a category of each object in the sequence based on the region feature of each segmented region further comprises:

determining, based on the region feature of a first segmented region, a probability that an object in the first segmented region belongs to each of a plurality of object categories, wherein the first segmented region is any one of all the segmented regions, and determining an object category with a maximum probability among the plurality of object categories as an object category to which the object in the first segmented region belongs.

2. The method according to claim 1, wherein the determining, based on the region feature of a first segmented region, a probability that an object in the first segmented region belongs to each of a plurality of object categories is implemented by a classification network, the classification network comprises a first convolution layer and a softmax layer, the number of convolution kernels in the first convolution layer is equal to the number of set object categories, a size of the convolution kernels is 1×N, N is a length of the region feature of each segmented region, and N is an integer greater than 1; and the determining, based on the region feature of a first segmented region, a probability that an object in the first segmented region belongs to each of a plurality of object categories comprises:

performing convolution processing on the region feature of the first segmented region by using each convolution kernel in the first convolution layer respectively, to determine a category feature belonging to each of the plurality of object categories among features of the first segmented region; and processing the category feature by using the softmax layer in the classification network, to determine a probability that the features of the first segmented region belong to each of the plurality of object categories.

3. The method according to claim 1, wherein the step of performing feature extraction on a to-be-processed image to obtain a first feature map of the to-be-processed image is implemented by a feature extraction network; the feature extraction network comprises a second convolution layer and a pooling layer; and the performing feature extraction on a to-be-processed image to obtain a first feature map of the to-be-processed image comprises:

performing feature extraction on the to-be-processed image by using the second convolution layer, to obtain a second feature map; and performing pooling processing on the second feature map by using the pooling layer, to obtain the first feature map, wherein a feature dimension of the first feature map is less than a feature dimension of the second feature map.

4. The method according to claim 1, wherein the to-be-processed image comprises an image of a surface of an object constituting the sequence along the stacking direction, and the stacking direction is a thickness direction of the object in the sequence.

5. The method according to claim 1, wherein at least one object among the plurality of objects in the sequence is a sheet-like object with a certain thickness.

6. The method according to claim 5, wherein a surface of the at least one object in the sequence along the stacking direction has a set identifier, and the identifier comprises at least one of a color, a texture, or a pattern.

7. The method according to claim 1, wherein the to-be-processed image is obtained by cropping the sequence from a collected image, and one end of the sequence is aligned with one edge of the to-be-processed image.

8. The method according to claim 7, wherein the plurality of objects in the sequence have a same thickness, and a length of the to-be-processed image along the stacking direction is k times the thickness of the objects in the sequence, or the plurality of objects in the sequence have different thicknesses, and the length of the to-be-processed image along the stacking direction is k times a maximum thickness of an object of a possible category in the sequence.

9. The method according to claim 1, further comprising: after the category of each object in the sequence is determined, determining a total value represented by the sequence based on a correspondence between the category and a value represented by the category.

10. An apparatus for recognizing a sequence in an image, comprising:

a processor; and a memory configured to store processor executable instructions, wherein the processor is configured to invoke the instructions stored in the memory, to:

perform feature extraction on a to-be-processed image to obtain a first feature map of the to-be-processed image, wherein the to-be-processed image comprises a sequence formed by stacking a plurality of objects along a stacking direction;

determine a region feature of each segmented region of a plurality of segmented regions in the to-be-processed image based on the first feature map, wherein all segmented regions of the plurality of segmented regions are obtained by dividing the to-be-processed image into k regions along the stacking direction, k is a set number of objects stacked along the stacking direction, and k is an integer greater than 1; and determine a category of each object in the sequence based on the region feature of each segmented region, wherein the determining a category of each object in the sequence based on the region feature of each segmented region further comprises:

determining, based on the region feature of a first segmented region, a probability that an object in the first segmented region belongs to each of a plurality of object categories, wherein the first segmented region is any one of all the segmented regions, and determining an object category with a maximum probability among the plurality of object categories as an object category to which the object in the first segmented region belongs.

11. The apparatus according to claim 10, wherein step of determining, based on the region feature of the first segmented region, the probability that an object in the first segmented region belongs to each of a plurality of object categories is implemented by a classification network, the classification network comprises a first convolution layer and a softmax layer, the number of convolution kernels in the first convolution layer is equal to the number of set object categories, a size of the convolution kernels is 1×N, N is a length of the region feature of each segmented region, and N is an integer greater than 1; and the determining, based on the region feature of the first segmented region, the probability that an object in the first segmented region belongs to each of a plurality of object categories comprises:

performing convolution processing on the region feature of the first segmented region by using each convolution kernel in the first convolution layer respectively, to determine a category feature belonging to each set object category among features of the first segmented region; and processing the category feature by using the softmax layer in the classification network, to determine a probability that the features of the first segmented region belong to each set object category.

12. The apparatus according to claim 10, wherein the step of performing feature extraction on the to-be-processed image to obtain the first feature map of the to-be-processed image is implemented by a feature extraction network; the feature extraction network comprises a second convolution layer and a pooling layer; and performing feature extraction on the to-be-processed image to obtain the first feature map of the to-be-processed image comprises:

performing feature extraction on the to-be-processed image by using the second convolution layer, to obtain a second feature map; and performing pooling processing on the second feature map by using the pooling layer, to obtain the first feature map, wherein a feature dimension of the first feature map is less than a feature dimension of the second feature map.

13. The apparatus according to claim 10, wherein the to-be-processed image comprises an image of a surface of an object constituting the sequence along the stacking direction, and the stacking direction is a thickness direction of the object in the sequence.

14. The apparatus according to claim 10, wherein a surface of at least one object among the plurality of objects in the sequence along the stacking direction has a set identifier, and the identifier comprises at least one of a color, a texture, or a pattern.

15. The apparatus according to claim 10, wherein the to-be-processed image is obtained by cropping the sequence from a collected image, and one end of the sequence is aligned with one edge of the to-be-processed image.

16. The apparatus according to claim 15, wherein the plurality of objects in the sequence have a same thickness, and a length of the to-be-processed image along the stacking direction is k times the thickness of the objects in the sequence, or the plurality of objects in the sequence have different thicknesses, and the length of the to-be-processed image along the stacking direction is k times a maximum thickness of an object of a possible category in the sequence.

17. The apparatus according to claim 10, wherein the processor is further configured to:

after the category of each object in the sequence is determined, determine a total value represented by the sequence based on a correspondence between the category and a value represented by the category.

18. A non-transitory computer readable storage medium having computer program instructions stored thereon, wherein the computer program instructions upon execution by a processor cause the processor to perform operations, the operations comprising:

performing feature extraction on a to-be-processed image to obtain a first feature map of the to-be-processed image, wherein the to-be-processed image comprises a sequence formed by stacking a plurality of objects along a stacking direction;

determining a region feature of each segmented region of a plurality of segmented regions in the to-be-processed image based on the first feature map, wherein all segmented regions of the plurality of segmented regions are obtained by dividing the to-be-processed image into k regions along the stacking direction, k is a set number of objects stacked along the stacking direction, and k is an integer greater than 1; and determining a category of each object in the sequence based on the region feature of each segmented region, wherein the determining a category of each object in the sequence based on the region feature of each segmented region further comprises:

determining, based on the region feature of a first segmented region, a probability that an object in the first segmented region belongs to each of a plurality of object categories, wherein the first segmented region is any one of all the segmented regions, and determining an object category with a maximum probability among the plurality of object categories as an object category to which the object in the first segmented region belongs.

* * * * *